United States Patent [19]
Parkin

[11] 3,913,162
[45] Oct. 21, 1975

[54] WHEEL WASHER

[76] Inventor: John C. Parkin, 1654 Fountain Head Road, Hagerstown, Md. 21740

[22] Filed: Jan. 10, 1974

[21] Appl. No.: 432,134

[52] U.S. Cl. .............................. 15/21 C; 15/DIG. 2
[51] Int. Cl.² ............................................. B60S 3/06
[58] Field of Search ...... 15/21 R, 21 C, 21 D, 21 E, 15/97, DIG. 2

[56] References Cited
UNITED STATES PATENTS
2,978,718  4/1961  Vani et al. ........................... 15/21 R
3,305,886  2/1967  Fricke ................................. 15/21 D

*Primary Examiner*—Edward L. Roberts

[57] ABSTRACT

For use in an automobile washing installation in which an automobile is moved along a prescribed path during which the automobile is washed by individual pieces of equipment designed specifically to clean each individual section, a wheel washer employing rotating brushes which follow the movement of the automobile to accomplish the wheel washing operation.

4 Claims, 9 Drawing Figures

FIG. 1

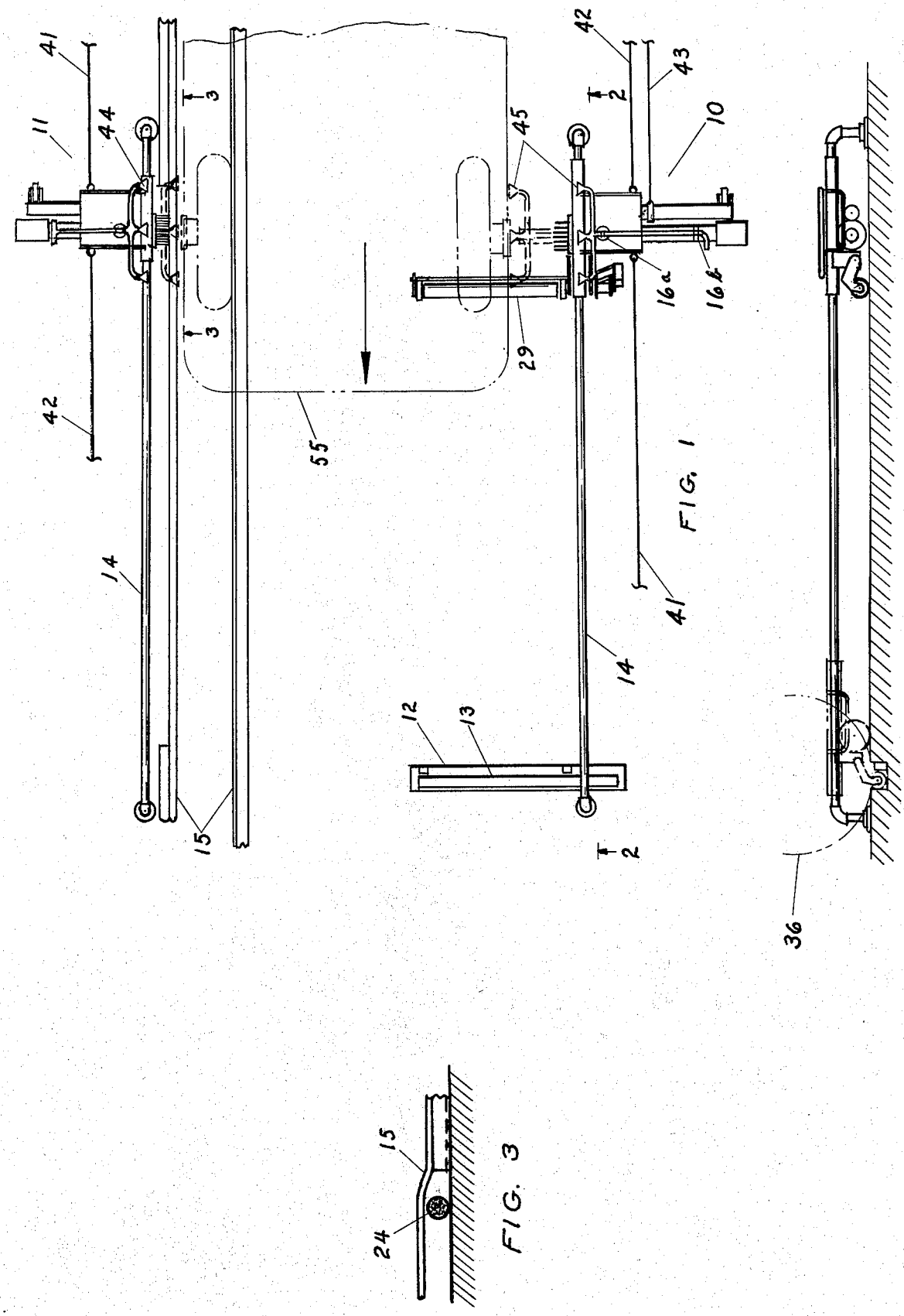

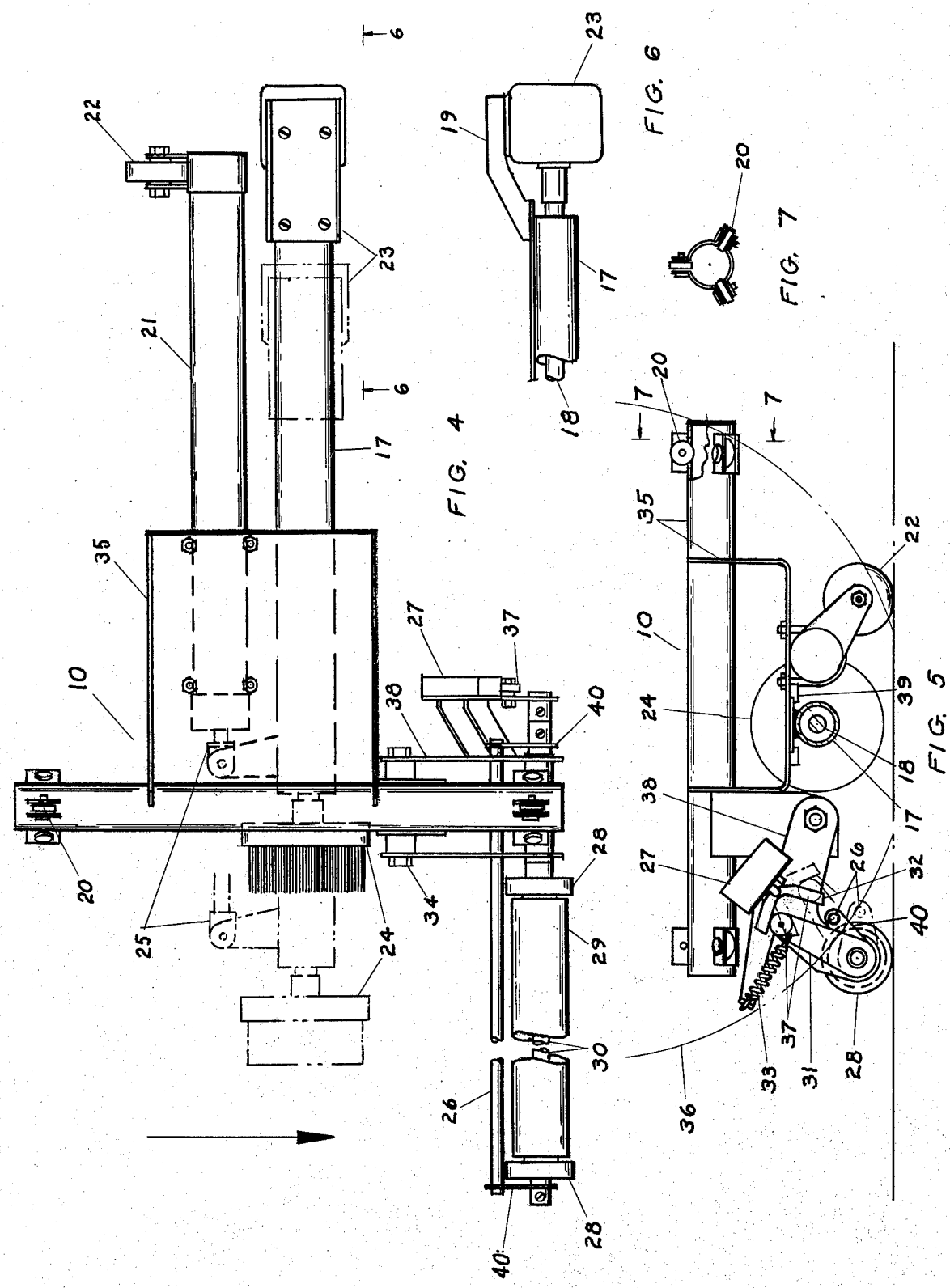

WHEEL WASHER

Various types of wheel washers are currently employed in the car washing industry. One popular type consists of multiple rollers that spin the wheels as the car moves over it. A brush is forced against the tire as the wheel spins thereby cleaning the tire. Another type does not involve spinning the wheels but rather utilizes a long (about 7 foot) cylindrical brush about 8 inches in diameter which is located parallel to the car and moves against the tire. The brush spins while contacting the tire. Certain disadvantages exist with each of the above described systems among which are high initial cost, high maintenance cost and something less than completely satisfactory cleaning as a result of design limitations on brush shape and cleaning agent application.

It is the object of the present invention to overcome the shortcomings of the foregoing. It is an object to provide an automobile wheel washer characterized by the provision of a small diameter circular brush which revolves around it's own axis and is forced against the tire of a moving vehicle following the tire until the tire has made one complete revolution during which time spray nozzles directed at the tire expell a cleaning agent upon the tire precisely at the desired location. Another object is to provide for the revolving brush and spray nozzles to return to their starting point once having followed a tire for one complete revolution of the tire. A further object is to provide for the revolving brush and spray nozzles to adjust their lateral positions to compensate for the varying widths of tires and varying widths of cars. Other objects are to provide power to revolve the brush and a control system to turn it on and off and to provide power to adjust the lateral position of the brush and spray nozzles and a control system to energize the power unit which activates these units.

Further objects of the invention will become apparent in connection with the annexed detailed description taken with the drawings in which:

FIG. 1 is a plan view of a wheel washer of an automobile washing unit.

FIG. 2 is a plan view of the wheel washer taken in the direction of line 2—2 of FIG. 1.

FIG. 3 is an isolated elevation view taken in the direction of line 3—3 of FIG. 1 illustrating one of the guide rails.

FIG. 4 is a plan view of the master carriage which contains the control system.

FIG. 5 is a side elevation view of the master carriage portions thereof being broken away for clarity.

FIG. 6 is a front elevation view taken at line 6—6 of FIG. 4.

FIG. 7 is an isolated elevation view taken on line 7—7 of FIG. 5.

Figure 8:
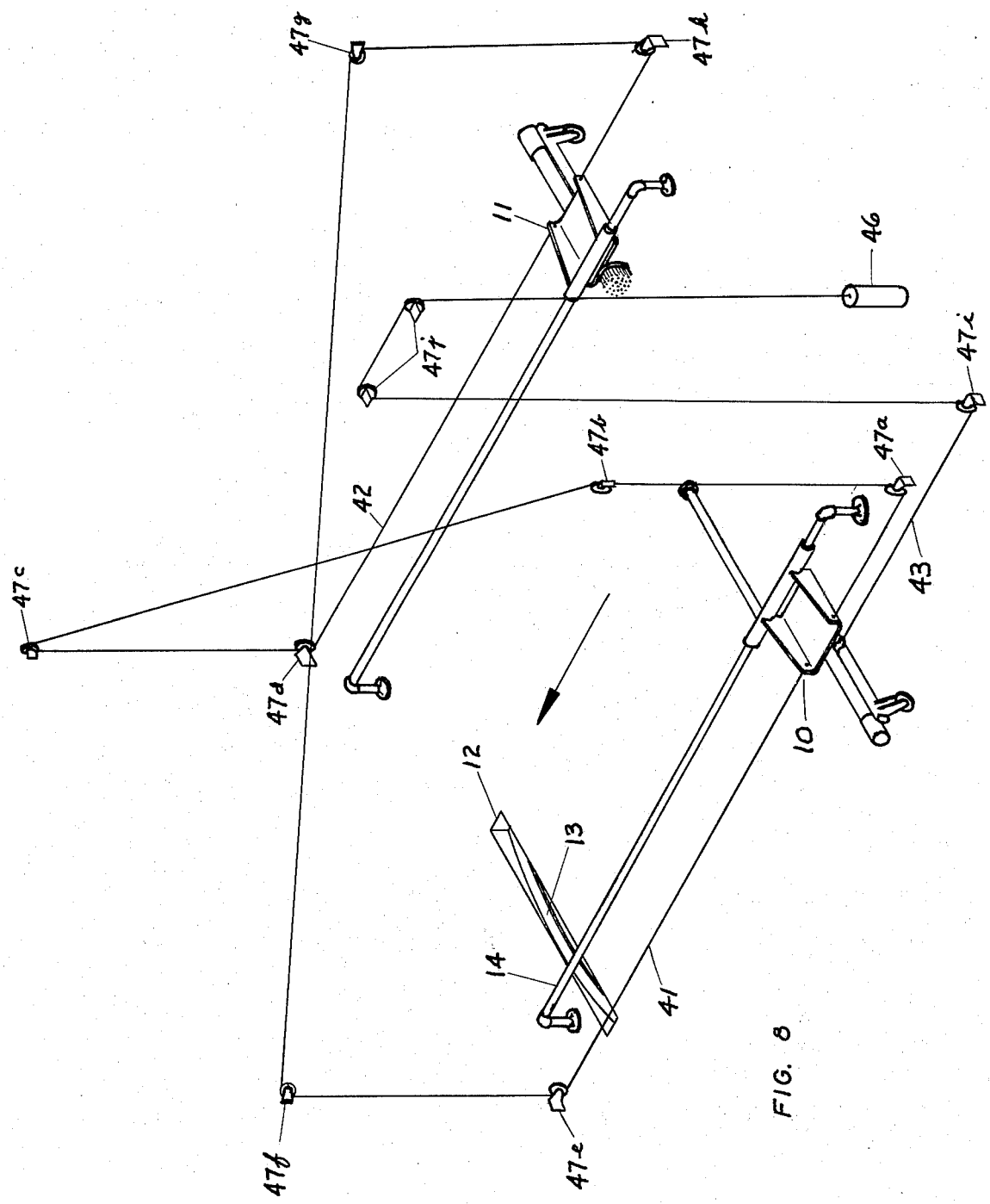
FIG. 8 is an isometric view of a wheel washer illustrating the method of propelling the slave carriage.

Reference is now made to the drawings, and in particular to FIG. 1 wherein there is shown a wheel washer comprised of a master carriage 10, a slave carriage 11, two guide tubes 14, a pit 12, a semi-elyptical spring 13, and three flexible cables 41, 42, and 43. Thus, as will be described in greater detail subsequently herein, an automobile 55, guided by guide rails 15, is urged in the direction of the arrow until the left front wheel comes into contact with roller 29, thereby propelling the roller and master carriage 10, of which it is a part, along guide rail 14, until roller 29 reaches pit 12 when the roller drops into the pit compressing spring 13 and allowing the left front wheel of the automobile to pass over the roller and continue it's travel as shown in FIG. 2. When the wheel has progressed sufficiently to clear roller 29, spring 13 lifts the roller out of the pit permitting master carriage 10 to return to its starting position.

Referring to FIG. 8, master carriage 10 is urged to it's starting position by weight 46 and flexible cable 43 passing over pulleys 47h and 47i. Slave carriage 11 maintains it's position directly opposite master carriage 10 by means of flexible cable 42, one end of which is attached to master carriage 10 and the other to slave carriage 11, and which rides over pulleys 47a, 47b, 47c and 47d and by flexible cable 41, one end of which is attached to slave carriage 11 and the other to master carriage 10 and which rides over pulleys 47h, 47g, 47f and 47e. Pulleys 47a through 47j are eash secured by a bracket to fixed structure capable of withstanding the applied loads.

Master carriage 10 and slave carriage 11 are identical in design and function except for the presence on master carriage 10 of the roller assembly which is contacted by the automobile tire, and the control system.

Reference is made to FIG. 4 and FIG. 5 for a detailed description of master carriage 10 which is supported and guided by guide tube 14 and rides thereon through the means of 6 bearings, 3 at each end, which serve to reduce friction. Roller 22, which rides on the floor, serves to stabilize the carriage assembly. Two bearings 28 also ride on the floor and support roller 29 which is free to revolve independently of bearings 28. These units are mounted on arm assembly 38 which is pivotally mounted to cradle assembly 35 at point 34. Thus, it can be seen that an automobile tire contacting roller 29 will cause master carriage 10 to move freely in the direction of automobile travel propelled by the tire.

As automobile tire 36 approaches roller 29 it comes into contact with trip bar 26 causing it to be depressed and, through means of arms 40 secured to rod 30, causes movement of arm 31, also secured to rod 30, and which contains bearing 37 which is in contact with cam 32 causing motion of cam 32 which results in activation of valve 27. This permits air to flow to linear actuator 21 resulting in movement of brush support 17 along it's guides 39 until brush 24 comes into contact with the tire. At the same time, air is admitted to pneumatic motor 23 which is secured to shaft 18 causing brush 24, also secured to shaft 18, to revolve thereby accomplishing the cleaning action of the tire. Upon completion of the travel, at the time when roller 29 drops into pit 12, the pressure of the tire is removed from trip bar 26, spring 33, attached to arm 31 causes arm 31 to assume it's start position thereby, through cam 32, restoring valve 27 to it's initial position causing brush support 17 and brush 24 to return to the fully retracted position and also causing pneumatic motor 23 to cease revolving. Master carriage 10 is now ready to receive the rear wheel of the automobile or the front wheel of the following automobile whichever the case may be.

FIG. 3 illustrates the method of permitting brush 24 on slave carriage 11 to contact the automobile tire which is positioned between guide rails 15. The vertical web of the outer guide rail is removed in the region of brush travel and the upper tubular member of the guide rail is bent upward so as to provide clearance for the brush to move under it while at the same time providing for continuous restraint of the automobile wheel in the guide rails.

The method of operation of the cleaning agent application system is best described by refering to FIG. 1. Nozzle assembly 45 is secured to brush support 17 by means of bracket 16b and is guided by bearing assembly 16a the bottom end of which is secured to cradle assembly 35. Thus, it can be seen that lateral movement of brush support 17 causes movement of nozzle assembly 45 toward or away from the tire to be cleaned. Travel toward the tire ceases when brush 24 comes in contact with the tire. Control valve 27 controls the flow of cleaning agent to the tire in the same manner that the control valve controls the travel of brush support 17 and the operation of pneumatic motor 23.

Figure 9:
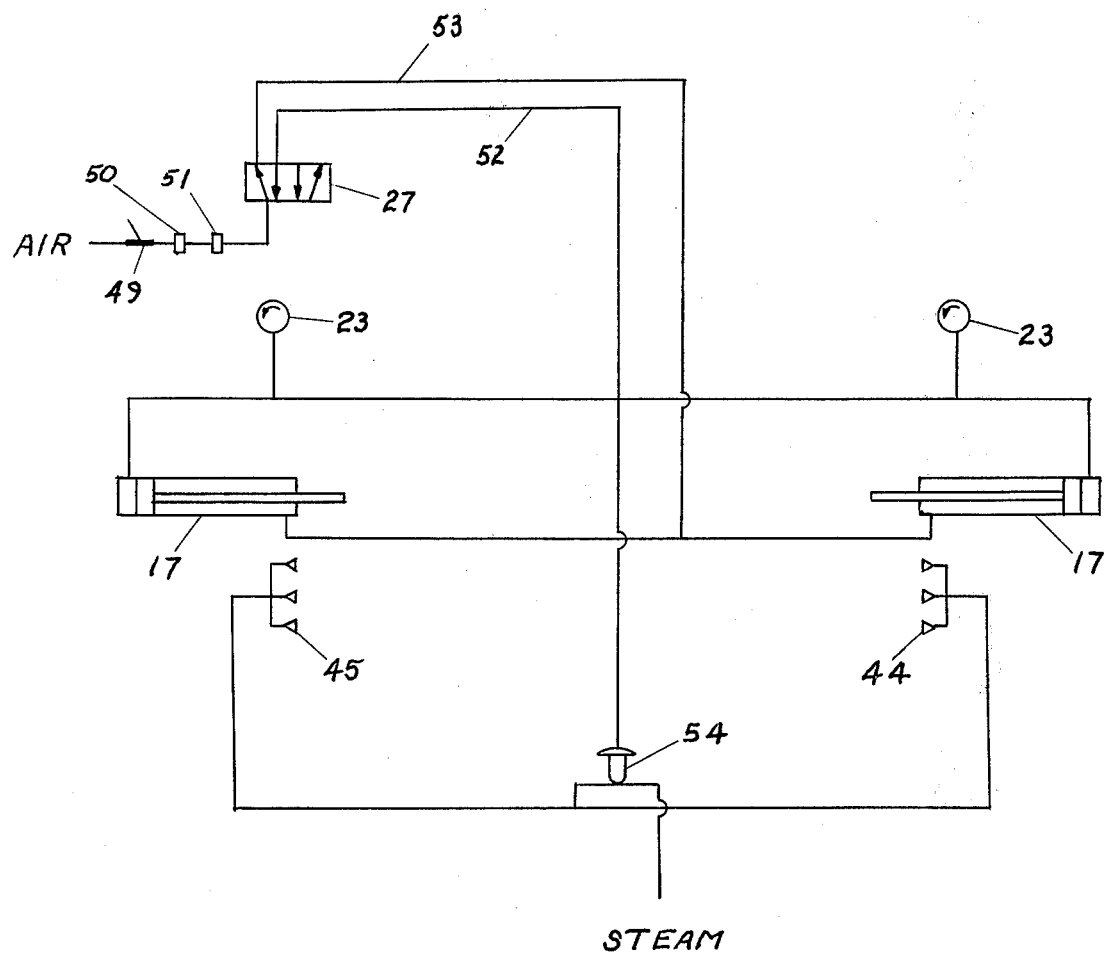
FIG. 9 is a schematic diagram of the pneumatic and steam systems for the respective carriages.

For a more thorough understanding of the details of operation of the control system reference is made to the schematic of the control system, FIG. 9. High pressure air from a supply source enters the system through a manual valve 49 and, after passing through an air filter 50 and filter lube unit 51 enters control valve 27 in the left hand position, as shown on the schematic, when the master carriage is at rest and trip bar 26 is in the up position. Air flows through line 53 to the piston rod ends of both linear actuators 17. When an automobile tire comes in contact with trip bar 26 depressing said bar the control valve 27 is switched to the right hand position and air flows through line 52 to linear actuators 17 causing the pistons to move in the direction of the automobile tires. At the same time air is directed to pneumatic motors 23 causing brushes 24 to rotate and to diaphragm valve 54 permitting steam, from a supply source, to flow to cleaning agent nozzles 44 and 45. When master carriage 10 reaches the end of it's travel and the pressure of the tire is removed from control bar 26 control valve 27 is switched to the left hand position thereby returning the linear actuators 17 to their fully retracted positions, stopping the rotation of pneumatic motors 23 and shutting off the flow of steam at diaphragm valve 54. The system is now ready to accept another automobile tire. Suitable flexible hoses are provided to supply air and steam to the system.

What is claimed is:

1. A wheel washing device for washing the wheels of a vehicle as the vehicle is moved along a prescribed path comprising two guide rails positioned on opposite sides of said path of travel in parallel relation thereto, a master carriage mounted on one of said guide rails and having freedom of motion from rearward to forward positions and being normally disposed in said rearward position, a slave carriage mounted on said opposite guide rail and having freedom of motion from rearward to forward positions, a pulley and cable system tying the master and slave carriages together so as to maintain them in a fore and aft relationship directly opposite each other, a roller pivotally mounted on said master carriage for movement about a horizontal axis and having freedom to move vertically along an arc having said axis as its center, said roller projecting into said path of travel of said vehicle in position to be engaged by said wheels to be washed to thereby urge said master carriage along said guide rail from said rearward position to said forward position, said pulley and cable system simultaneously maintaining the required fore and aft positioning of said slave carriage on said opposing guide rail, a pit located in the path of said roller at the forward most position of said roller's travel and having such size and shape as to accept said roller completely thereby permitting continued forward travel of said wheel over said roller, means for ejecting said roller from said pit upon release of said roller by said wheel, means for returning said carriages to said rearward positions on said guide rails, means mounted on said carriages for cleaning and scrubbing said wheels during said movement of said carriages from said rearward position to said forwrd position.

2. A wheel washing device as claimed in claim 1 said cleaning and scrubbing means wheelwashing means movably mounted on said carriages and adapted to be laterally extended outward from said carriages toward said wheel.

3. A wheel washing device as claimed in claim 2 comprising a trip bar positioned adjacent and parallel to said roller, said trip bar being activated by said automobile wheel thereby setting into motion said wheel washing means.

4. A wheel washing device for washing the wheels of a vehicle as the vehicle is moved along a prescribed path comprising two guide rails positioned on opposite sides of said path of travel in parallel relation thereto, a master carriage mounted on one of said guide rails and having freedom of motion from rearward to forward positions and being normally disposed in said rearward position, a slave carriage mounted on said opposite guide rail and having freedom of motion from rearward to forward positions, a pulley and cable system tying the master and slave carriages together so as to maintain them in a fore and aft relationship directly opposite each other, a roller pivotally mounted on said master carriage for movement about a horizontal axis and having freedom to move vertically along an arc having said axis as its center, said roller projecting into said path of travel of said vehicle in position to be engaged by a wheel to be washed to thereby urge said master carriage along said guide rail from said rearward position to said forward position, said pulley and cable system simultaneously maintaining the required fore and aft positioning of said slave carriage on said opposing guide rail, a pit located in the path of said roller at the forwardmost position of said roller's travel and having such size and shape as to accept said roller completely thereby permitting continued forward travel of said wheel over said roller, means for ejecting said roller from said pit upon release of said roller by said wheel, means for returning said carriages to said rearward positions on said guide rails, wheel washing means movably mounted on each of said carriages and adapted to be laterally extended outward therefrom toward said wheels, a trip bar positioned adjacent and parallel to said roller, said trip bar being activated by said wheel and operating a valve thereby setting said wheel washing means into motion.

* * * * *